United States Patent [19]
Moren et al.

[11] Patent Number: 5,866,651
[45] Date of Patent: Feb. 2, 1999

[54] HYDROXYCARBAMOYLALKOXYSILANE-BASED POLY(ETHER-URETHANE) SEALANTS HAVING IMPROVED PAINT ADHESION AND LAMINATES PREPARED THEREFROM

[75] Inventors: Dean M. Moren, North St. Paul, Minn.; Ian R. Owen, River Falls, Wis.; Kevin M. Eliason, Harris, Minn.; Glen A. Stenlund, Cottage Grove, Minn.; W. Stuart Bigham, Mahtomedi, Minn.

[73] Assignee: Minnesota Mining and Manufacturing Company, St. Paul, Minn.

[21] Appl. No.: 741,593

[22] Filed: Oct. 31, 1996

[51] Int. Cl.$^6$ ................ C08J 3/00; C08K 3/20; C08L 75/00
[52] U.S. Cl. .............. 524/588; 428/423.1; 524/590; 528/28; 528/44
[58] Field of Search .................. 524/590, 588; 528/28, 44; 428/423.1

[56] References Cited

U.S. PATENT DOCUMENTS

| | | | |
|---|---|---|---|
| 3,033,815 | 5/1962 | Pike et al. | 260/46.5 |
| 3,627,722 | 12/1971 | Seiter | 260/37 N |
| 3,632,557 | 1/1972 | Brode et al. | 260/77.5 TB |
| 4,067,844 | 1/1978 | Barron et al. | 260/37 N |
| 4,345,053 | 8/1982 | Rizk et al. | 525/440 |
| 4,468,492 | 8/1984 | Piccirilli et al. | 525/102 |
| 4,628,076 | 12/1986 | Chang et al. | 528/28 |
| 4,857,623 | 8/1989 | Emmerling et al. | 528/28 |
| 5,095,045 | 3/1992 | Winkel et al. | 523/115 |
| 5,118,290 | 6/1992 | Müller et al. | 433/48 |
| 5,174,813 | 12/1992 | Cifuentes et al. | 106/3 |
| 5,364,955 | 11/1994 | Zwiener et al. | 556/418 |
| 5,464,888 | 11/1995 | Owen | 524/104 |
| 5,476,889 | 12/1995 | Owen | 524/170 |
| 5,587,502 | 12/1996 | Moren et al. | 556/420 |

FOREIGN PATENT DOCUMENTS

| | | | |
|---|---|---|---|
| 2102272 | 5/1994 | Canada | C07F 7/10 |
| 0 164 520 A1 | 4/1984 | European Pat. Off. | |
| 0 210 444 A1 | 6/1985 | European Pat. Off. | |
| 0 269 819 A2 | 10/1986 | European Pat. Off. | |
| 0 410 199 A2 | 7/1989 | European Pat. Off. | |
| 0 459 304 A2 | 5/1990 | European Pat. Off. | |

OTHER PUBLICATIONS

Abstract XP–002054566 Derwent Publications Ltd., London, GB; Class A26, AN 72–05610T.

J. Baghdachi, "Polyether Silicons Provide Urethane Properties with Superior Adhesion," *Adhesives & Sealants Industry*, 1994, vol. 1(4), pp. 22–25.

*Primary Examiner*—Patrick D. Niland
*Attorney, Agent, or Firm*—Janice L. Dowdall

[57] ABSTRACT

The present invention pertains to moisture curable sealant compositions based on alkoxysilane functional poly(ether-urethane)s prepared from hydroxycarbamoylalkoxysilanes which provide improved paint adhesion even in the absence of polar solvents or polar plasticizers. The present invention also provides coated substrates and laminates formed from such compositions.

71 Claims, No Drawings

HYDROXYCARBAMOYLALKOXYSILANE-BASED POLY(ETHER-URETHANE) SEALANTS HAVING IMPROVED PAINT ADHESION AND LAMINATES PREPARED THEREFROM

FIELD OF THE INVENTION

The present invention pertains to moisture curable sealant compositions based on alkoxysilane functional poly(ether-urethane)s prepared from hydroxycarbamoylalkoxysilanes which provide improved paint adhesion even in the absence of polar solvents or polar plasticizers. The present invention also provides coated substrates and laminates formed from such compositions.

BACKGROUND OF THE INVENTION

Sealants are often used in automotive, marine, aerospace, and construction markets to fill gaps, to prevent corrosion, and to create aesthetically pleasing surfaces. Commercially viable sealants strike an acceptable balance among end use performance properties such as cure speed, shelf life, rheological characteristics, adhesion to various substrates, and thermal and ultraviolet light stability. Consequently, such sealants typically contain rheology modifiers, adhesion promoters, oxidative stabilizers, plasticizers, and cure catalysts. A variety of technologies have been found useful in the manufacture of these sealants, including acrylic latexes, moisture curing silicones, and moisture curing isocyanate functional polymers. Moisture curing isocyanate functional polymers generally cure rapidly and, after cure, provide good adhesion to paint overcoats. Therefore, in applications which require that the sealant be painted soon after it is applied to a substrate, sealants based on moisture curing isocyanate functional polymer technology are particularly preferred. Even so, several problems attend the use of sealants based on moisture curing isocyanate functional polymers; under very hot, humid conditions these sealants are prone to foaming and the alcoholic co-solvents which are present in many paints react with the isocyanate termini of the moisture curing isocyanate functional polymers thereby rendering them non-reactive and permanently preventing cure.

Recently, sealants based on moisture curing alkoxysilane functional polymers have been proposed as alternative to those based on moisture curing isocyanate functional polymers. The alkoxysilane functional polymers are preferred over isocyanate functional polymers especially because they do not foam under hot, humid conditions and they cure properly even in the presence of alcoholic paint co-solvents. It is possible, therefore, to paint sealants based on alkoxysilane functional polymers before they are fully cured (i.e., wet-on-wet) thereby eliminating the non-productive cure time required before painting sealants based on moisture curing isocyanate functional polymers.

Alkoxysilane functional polymers known in the art have been prepared by numerous methods including: condensation of isocyanate functional polymers with amine, mercaptan, or hydroxyl functional silanes; condensation of amine, mercaptan, or hydroxyl functional polymers with isocyanate functional silanes; coupling of mercaptan or hydrosilane functional polymers with alkene functional silanes; and coupling of alkene functional polymers with mercaptan functional silanes or alkoxyhydrosilanes. Alkoxysilane functional polymers may be compounded to form materials useful as moisture curable sealants. While a large number of alkoxysilane functional polymers has been disclosed in the art, none provide moisture curing sealants exhibiting acceptable paint adhesion when the paint is applied during the latter stages of cure.

U.S. Pat. No. 3,627,722 (Seiter), U.S. Pat. No. 4,067,844 (Barron et al.), U.S. Pat. No. 4,857,623 (Emmerling et al.), and U.S. Pat. No. 5,364,955 (Zwiener et al.) each disclose alkoxysilane functional poly(ether urethanes). None of these teaches a moisture curable sealant exhibiting acceptable paint adhesion when the paint is applied during the latter stages of cure.

U.S. Pat. Nos. 5,476,889 and 5,464,888 (Owen) describe alkoxysilane functional polymer based sealant compositions in which the alkoxysilane endgroups are attached to a polypropylene oxide backbone through alkylene linking groups. While the initial paint adhesion of these sealant compositions was improved through incorporation of polar plasticizers such as N-ethyl-p-toluenesulfonamide or polar solvents such as N-methylpyrrolidinone, the paint adhesion decreases to unacceptable levels as the alkoxysilane functional polymer cures.

SUMMARY OF THE INVENTION

In spite of the considerable advantages provided by sealants based on alkoxysilane functional polymers, we have observed an unacceptable, time dependent decrease in the adhesion of paint to the previously known moisture curable sealants based on alkoxysilane functional polymers. In fact, we have observed that previously known alkoxysilane functional polymers provide only minimal paint adhesion when the sealants are allowed to cure completely prior to paint application. This exactly opposes what is observed with sealants based on moisture curing isocyanate functional polymers. Incorporation of additives such as polar plasticizers and polar solvents into sealants based on alkoxysilane functional polymers improves the adhesion of paint during initial stages of cure, but the improvement is insufficient for many applications and the presence of polar solvents and polar plasticizers is often problematic due to migration and high cost.

Therefore, there exists an unmet need for moisture curing sealants based on alkoxysilane functional polymers which provide improved paint adhesion even in the absence of polar solvents or polar plasticizers.

The present invention pertains to moisture curable sealant compositions based on alkoxysilane functional poly(ether-urethane)s which provide improved paint adhesion even in the absence of polar solvents or polar plasticizers. The present invention also provides coated substrates and laminates formed from such composition. The moisture curable sealant composition of the present invention comprises an alkoxysilane functional poly(ether-urethane) having empirical formula I:

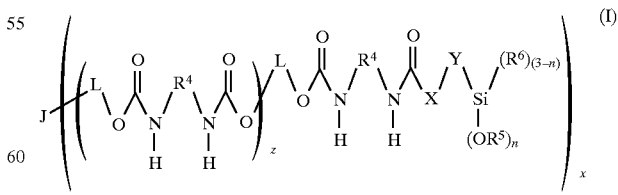

wherein:
J is selected from the group consisting of alkyl, aryl, alkylene, alklarylene, and arylene with valence x and a number average molecular weight of less than about 250, preferably methyl, ethyl, methylene, ethylene, or 1,1,1-propanetrimethylene;

each L is independently selected from the group consisting of (i) a polyether segment comprising greater than about 15 mol % and less than about 40 mol % ethylene oxide (EO) units distributed randomly or in blocks (the segment preferably comprising 20 to 30 mol % EO) and the segment having a number average molecular weight of about 2000 to about 8000 (preferably about 3000 to about 6000), and (ii) a divalent alkylene group having a number average molecular weight of less than about 200;

each $R^4$ is independently selected from the group consisting of $C_2$ to $C_{10}$ alkylene and cycloalkylene, preferably 1,6-hexylene and 1-(3-methylene)-3,5,5-trimethylcyclohexenyl, most preferably 1-(3-methylene)-3,5,5-trimethylcyclohexenyl (i.e., isophorone-diyl);

each z is independently selected from the group consisting of integers greater than or equal to zero, preferably 0 to 4;

each X is independently a divalent linking group having formula

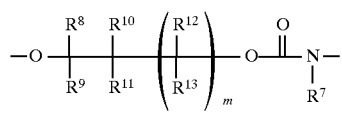

wherein each $R^8$, $R^9$, $R^{10}$, $R^{11}$, $R^{12}$, and $R^{13}$ is independently selected from the group consisting of hydrogen, $C_1$ to $C_6$ alkyl, and aryl (preferably independently selected from the group consisting of hydrogen and methyl); m is independently selected from the group consisting of integers 0 to 2 (preferably 0); and each $R^7$ is independently selected from the group consisting of hydrogen and $C_1$ to $C_6$ alkyl (preferably hydrogen);

each Y is independently selected from the group consisting of linear, branched, and cyclic alkylene groups having at least two (preferably 2 to 10) carbon atoms, most preferably —$CH_2CH_2CH_2$—;

each $R^5$ is independently selected from the group consisting of alkyl groups having at least two carbon atoms, preferably $C_2$ to $C_4$ alkyl, more preferably ethyl;

each $R^6$ is independently selected from the group consisting of hydrogen, alkyl, and aryl;

each n is independently selected from the group consisting of integers 1 to 3 (preferably 3);

x is selected from the group consisting of integers greater than or equal to 1, preferably 1 to 6, most preferably 2 to 4.

The moisture curable sealant composition of the present invention comprises a homogenous blend comprising:

(a) 100 parts by weight of an alkoxysilane functional poly(ether-urethane) of formula I;

(b) 10 to 100 (more preferably 40 to 100) parts by weight of at least one plasticizer;

(c) 0.1 to 10 (more preferably 3 to 8) parts by weight of at least one antioxidant;

(d) 1 to 5 (more preferably 1 to 3) parts by weight of at least one catalyst;

(e) 0.1 to 10 (more preferably 3 to 6) parts by weight of at least one adhesion promoter;

(f) 0 to 10 (more preferably 1 to 5) parts by weight of at least one dehydrator;

(g) 0 to 400 (more preferably 250 to 350) parts by weight of at least one filler;

(h) 0 to 10 (more preferably 3 to 8) parts by weight of at least one rheology modifier; and (i) 0 to 40 parts by weight of an organic solvent.

The present invention further comprises a laminate article, wherein the laminate comprises:

(a) a substrate;

(b) a layer of the moisture curable sealant composition of the invention coated on at least a portion of the substrate; and (c) a layer of one or more of the following coated over the layer of the moisture curable sealant composition: (i) paint, (ii) primer, (iii) paint sealer.

The present invention even further comprises a cured laminate article, wherein the laminate comprises:

(a) a substrate;

(b) a cured layer of the moisture curable sealant composition of the invention which is bonded to at least a portion of the substrate; and (c) a layer of one or more of the following coated over the cured layer of the moisture curable sealant composition: (i) paint, (ii) primer, (iii) paint sealer.

A preferred embodiment of the present invention comprises a laminate article, wherein the laminate comprises:

(a) a substrate;

(b) a layer of the moisture curable sealant composition of the invention coated on at least a portion of the substrate;

(c) a layer of primer coated over the layer of moisture curable sealant composition; and (d) a layer of paint coated over the layer of primer.

A preferred embodiment of the present invention comprises a cured laminate article, wherein the laminate comprises:

(a) a substrate;

(b) a cured layer of the moisture curable sealant composition of the invention bonded to at least a portion of the substrate;

(c) a layer of primer coated over the cured layer of moisture curable sealant composition; and (d) a layer of paint coated over the layer of primer.

The laminate articles described above may include, for example, portions of land vehicles (such as automobiles, buses, trucks, vans, trains, etc.), aircraft, and watercraft (such as boats).

DETAILED DESCRIPTION OF THE INVENTION

A. Polymer of Formula (I) and its Formation

The present invention provides a moisture curable sealant composition comprising an alkoxysilane functional poly(ether-urethane) of formula (I) as previously defined:

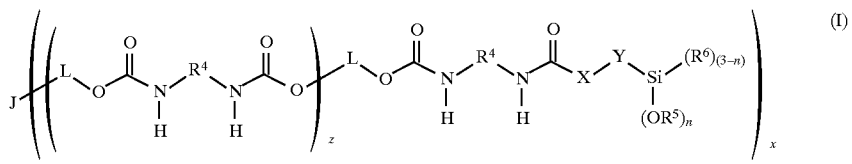

The alkoxysilane functional poly(ether-urethane) is the reaction product of an isocyanate functional poly(ether-urethane) of formula (IV):

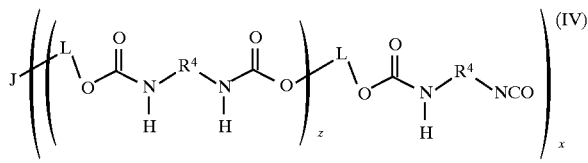

wherein J, L, $R^4$, z and x are as previously defined, and a hydroxycarbamoylalkoxysilane endgroup precursor compound of formula (V):

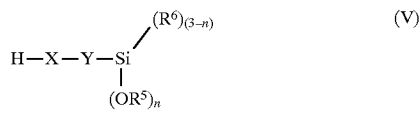

wherein $R^6$, X, $R^5$, Y and n are as previously defined. The endgroup precursor compound of formula (V) may be formed, for example, by reaction of a substituted cyclic alkylene carbonate of formula (VI) with an aminoalkylenealkoxysilane of formula (VII) as taught in allowed U.S. patent application Ser. No. 08/460,349 assigned to the assignee of the present case, incorporated by reference herein.

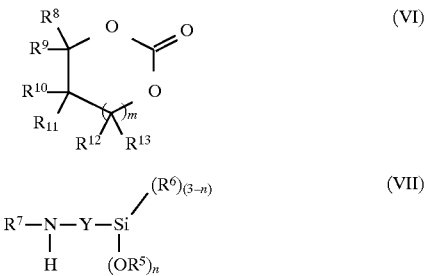

in which Y, $R^5$, $R^6$, $R^7$, $R^8$, $R^9$, $R^{10}$, $R^{11}$, $R^{12}$, and $R^{13}$, m, and n have the definitions provided above.

Preferably, the hydroxycarbamoylsilane endgroup precursor compounds are adducts of ethylene carbonate or propylene carbonate with 3-aminopropyltriethoxysilane, specifically:

N-(3-triethoxysilylpropyl)-1-hydroxy-2-ethyl carbamate wherein $R^8$, $R^9$, $R^{10}$, and $R^{11}$ are each hydrogen; m is 0; $R^7$ is hydrogen; Y is 1,3-propylene; $R^5$ is ethyl and n is 3 in formulas VI and VII;

N-(3-triethoxysilylpropyl)-2-hydroxy-1-propyl carbamate wherein $R^8$ is methyl; $R^9$, $R^{10}$, and $R^{11}$ are each hydrogen; m is 0; $R^7$is hydrogen, Y is 1,3-propylene; $R^5$ is ethyl and n is 3 in formulas VI and VII; and N-(3-triethoxysilylpropyl)-1-hydroxy-2-propyl carbamate wherein $R^{10}$ is methyl; $R^8$, $R^9$ and $R^{11}$ are each hydrogen; m is 0; $R^7$ is hydrogen, Y is 1,3-propylene; $R^5$ is ethyl and n is 3 in formulas VI and VII.

A.i. Preparation of Isocyanate Functional Poly(ether-urethane)s

The isocyanate functional poly(ether-urethane) of formula (IV) may be prepared by the condensation reaction of one or more isocyanate reactive materials with an excess of one or more polyisocyanates, preferably diisocyanates, and preferably in the presence of a catalyst. Isocyanate reactive materials useful according to the invention include polyethers which have molecular weights of about 2000 to about 8000, EO contents greater than about 15 mol % and less than about 40 mol %, and one or more hydroxyl, mercaptan, primary or secondary amine groups. Isocyanate reactive materials useful according to the invention also include diols and diamines having a number average molecular weights of less than about 200 (known in the art as "chain extenders"). Blends of two or more isocyanate reactive materials may be used to make the isocyanate functional poly(ether-urethane)s. A summary of basic polyurethane chemistry can be found in *Polyurethanes: Chemistry and Technology*, Saunders and Frisch, Interscience Publishers (New York, 1963 (Part I) and 1964 (Part II)).

Preferred isocyanate reactive materials are block and random copolymers of ethylene oxide and propylene oxide having number average molecular weights in the range of from about 2000 to about 8000, more preferably from about 3000 to about 6000 and containing greater than about 15 mol % and less than about 40 mol % ethylene oxide (EO) units, more preferably about 20 mol % to about 30 mol % EO. Diols are especially preferred. When the EO content is less than or equal to about 15 mol %, little improvement in paint adhesion is observed. When the EO content is above about 40 mol %, the viscosity of the sealant often rises, moisture sensitivity increases, and compatibility with additives may be reduced.

Polyether diols are commercially available from a large number of sources and may be prepared by ring-opening polymerization reactions that are well known in the polymer art. The chemistry and mechanism of ring-opening polymerizations, for example, are discussed in detail in *Ring-Opening Polymerization* (Volumes 1, 2, and 3) edited by K. J. Ivin and T. Saegusa, 1984. Polyether diols useful as synthons in the present invention comprises ethylene oxide and higher alkylene oxide randomly or in blocks. Sequential polymerization of ethylene oxide (EO) and higher alkylene oxide, preferably propylene oxide (PO), will produce block copolymers, for example those having an internal polypropylene oxide block and terminal polyethylene oxide blocks, hereinafter denoted EO(PO)EO, and those having an internal polyethylene oxide block and terminal polypropylene oxide blocks, hereinafter denoted PO(EO)PO. Simultaneous polymerization of ethylene oxide and higher alkylene oxide, preferably propylene oxide, will produce random copolymers, hereinafter denoted EO/PO.

Numerous polyether diols are commercially available, for example from BASF Corporation, Mount Olive N.J.; Dow Chemical Company, Midland, Mich.; Olin Chemicals, Stamford, Conn.; and ARCO Chemical Company, Newtown Square, Pa. A particularly preferred polyether diol is Pluronic L92 from ARCO, an EO(PO)EO block copolymer having 20 mol % EO units and number average molecular weight of about 3650.

Suitable polyisocyanates useful in preparation of isocyanate functional poly(ether-urethane)s of formula (IV) include aliphatic and cycloaliphatic polyisocyanates. Representative examples of useful polyisocyanates include the diisocyanates isophorone diisocyanate (hereinafter denoted IPDI) and 1,6-hexanediisocyanate. Dimers and trimers of the above mentioned diisocyanates, for example those containing uretadione, biuret, and isocyanurate linkages, are also contemplated. A preferred polyisocyanate is IPDI.

The condensation reaction to form an isocyanate functional poly(ether-urethane) is typically conducted in the presence of up to 5% by weight (wt %) catalyst based on the isocyanate reactive material weight, preferably 0.02 to 0.4 wt %. Examples of useful catalysts include but are not limited to those listed in *Polyurethanes: Chemistry and Technology*, Part I, Table 30, Chapter 4, Saunders and Frisch, Interscience Publishers, New York, 1963. Preferred catalysts are the tin IV compounds, for example dibutyltin dilaurate.

The reaction time required to convert the reactants to the desired isocyanate functional poly(ether-urethane)s will vary widely. Reaction times will depend upon several factors, including the nature of the reactants, the concentration of reactants, and the temperature of the reaction. Progress of the reaction is readily monitored by infrared (IR) spectroscopy by following the reduction of the isocyanate stretching frequency near 2270 cm$^{-1}$. Suitable reaction temperatures are usually between 0° C. and 120° C., preferably between 25° C. and 90° C., more preferably between 50° C. and 90° C.

A.ii. Preparation of Alkoxysilane Functional Poly(ether-urethane)s

The alkoxysilane functional poly(ether-urethane) of formula (I) useful in the present invention is prepared by reacting an isocyanate functional poly(ether-urethane) of formula (IV) with the endgroup precursor of formula (V) described above. Preferably, the isocyanate functional poly (ether-urethane) has a number average molecular weight in the range of about 6000 to about 10,000, more preferably about 7000 to about 9000. Preferably, the ratio of equivalents of NCO to equivalents of endgroup precursor is 1:1. Preferably, a stepwise procedure is followed whereby the isocyanate functional poly(ether-urethane) is separately formed and then combined with the endgroup precursor to form the alkoxysilane functional poly(ether-urethane).

The reaction time required to convert the reactants to the desired alkoxysilane functional poly(ether-urethane)s of formula (I) will vary widely. Reaction times will depend upon several factors, including the nature of the reactants, the concentration of reactants, and the temperature of the reaction. Progress of the reaction is readily monitored by infrared (IR) spectroscopy by following the disappearance of the isocyanate stretching frequency near 2270 cm$^{-1}$. Suitable reaction temperatures are usually between 0° C. and 120° C., preferably between 25° C. and 90° C., more preferably between 50° C. and 90° C.

B. Moisture Curable Sealant Compositions

The moisture curable sealant compositions of the present invention comprise at least one alkoxysilane functional poly(ether-urethane) of formula (I), at least one plasticizer, at least one antioxidant, at least one catalyst, and at least one adhesion promoter. The moisture curable sealant compositions of the present invention may further comprise one or more of the following optional ingredients: rheology modifiers, biocides, corrosion inhibitors, dehydrators, organic solvents, fillers, colorants, photostabilizers, and perfumes. The components may be combined before or during the formation of the alkoxysilane functional poly(ether-urethane), provided that the components are not reactive with isocyanate. Preferably, the components are combined with the alkoxysilane functional poly(ether-urethane) after its formation. Each component is introduced to perform a specific function and should be present at a level sufficient to perform that function.

Catalysts present in the moisture curable sealant compositions of the present invention enable the sealants to cure at rapid, controllable rates. Useful catalysts include, for example, metal salts and complexes, amines, and organic and inorganic acids. Specific examples of useful catalysts include dibutyltin diacetylacetonate, tetraisopropyl titanate, calcium oxide, N,N,N',N'-tetramethylguanidine, tetrabutylammonium hydroxide, trifluoroacetic acid, and dibutyl phosphate.

Plasticizers present in the moisture curable sealant compositions of the present invention lower the viscosities of the sealants before cure and lower their moduli after cure. Useful plasticizers include, for example, benzoates, phthalates, adipates, and sulfonamides. It is generally preferred that the amount of plasticizer not exceed about 20% of the total weight of the composition. Specific examples of useful plasticizers include butyl benzyl phthalate, dipropylene glycol dibenzoate, dioctyl adipate, N-ethyl-p-toluenesulfonamide, diisodecyl phthalate, and dibutyl phthalate.

Adhesion promoters present in the moisture curable sealant compositions of the present invention provide good bonding between the sealants and the various substrates to which they are applied. Useful adhesion promoters include silanes, for example, 3-(2-aminoethyl) aminopropyltrimethoxysilane, 3-glycidoxypropyltrimethoxysilane, and 3-mercaptopropyltrimethoxysilane.

Antioxidants present in the moisture curable sealant compositions of the present invention retard the oxidative degradation of its organic components. The presence of an antioxidant is especially important when the sealant is to be used in extreme temperature environments. Examples of useful antioxidants include but are not limited to those selected from the group consisting of hindered phenols and hindered amines. Specific example of useful antioxidants include 2,6-di-tert-butyl4-methylphenol, pentaerythritol tetrakis[3-(3,5-di-tert-butyl-4-hydroxyphenyl)propionate], bis(1,2,2,6,6-pentamethyl-4-piperidinyl) sebacate, and bis (2,2,6,6-tetramethyl-4-piperidyl) sebacate. Preferably, the antioxidant comprises a mixture of about 20 wt % hindered amine and 80 wt % hindered phenol.

Rheology modifiers which may be present in the moisture curable sealant compositions of the present invention cause the sealants to resist flow under static conditions, yet allow desirable flow while under shear. Useful rheology modifiers include, for example, castor waxes, fumed silicas, treated clays, and polyamides. Preferably, the rheology modifier is non-reactive with the alkoxysilane functional poly(ether-urethane).

Although not preferred because of environmental and energy considerations, one or more organic solvents may be present in the moisture curable sealant compositions of the present invention. Organic solvents reduce sealant viscosities. When used, preferred solvents are those which are unreactive with isocyanates and alkoxysilanes and include, for example, ketones, ethers, esters, amides, and hydrocarbons. Specific examples of preferred solvents include acetone, butanone, ethyl acetate, toluene, naphtha, N-methylpyrrolidinone, N,N-dimethylformamide, acetonitrile, tetrahydrofuran, 1-methoxy-2-propyl acetate, and Isopar H (an aliphatic hydrocarbon solvent available from Exxon). Especially preferred solvents are polar solvents. A specific example of an especially preferred solvent is N-methylpyrrolidinone.

Dehydrators which may be present in the moisture curable sealant compositions of the present invention react with any moisture which may enter the sealant during processing or during storage and thus prevent premature gelation. Specific examples of useful dehydrators include vinyltrimethoxysilane, trimethyl orthoformate, tetra (butanone oximino)silane, and vinyltri(butanone oximino) silane.

Fillers which may be present in the moisture curable sealant compositions of the present invention may be added to alter the color, rheology, and ultimate mechanical properties of the moisture curable sealant composition. Examples of useful fillers include carbon black, calcium carbonate, titanium dioxide, iron oxide, talc, ceramic microspheres, and clay. The fillers are preferably free of groups which react with the alkoxysilane functional poly(ether-urethane)s. Stearic acid surface treated, precipitated calcium carbonates are preferred fillers in applications where low cost and opacity are desirable.

Ultraviolet light stabilizers which may be present in the moisture curable sealant compositions of the present invention absorb ultraviolet radiation, thereby shielding the other organic components from this harmful energy. Useful ultraviolet light stabilizers include substituted hydroxyphenylbenzotriazoles. A specific example of a useful ultraviolet light stabilizer is 2-(3,5-di-tert-butyl-2-hydroxyphenyl)-5-chlorobenzotriazole.

C. Formulation of the Moisture Curable Sealant Compositions

The moisture curable sealant compositions of the invention may be formulated such that, they provide good adhesion to a variety of substrates, they provide good adhesion to a variety of paints, primers, and paint sealers, and they are sprayable, caulkable, or paste-like.

The physical properties of the moisture curable sealant compositions before and after cure will depend strongly on the amounts and identities of the components comprising the moisture curable sealant compositions. Viscosities of the moisture curable sealant compositions before cure will generally decrease, for example, with increasing levels of solvent or plasticizer, decreasing alkoxysilane silane functional poly(ether-urethane) molecular weight, decreasing filler concentration, and increasing filler particle size. A desirable viscosity for a sprayable moisture curable sealant composition, for example, would be between about 400 and about 700 Pa sec (Brookfield spindle #7 at 2 rpm, 22° C.). Ultimate elongations of the moisture curable sealant compositions after cure will generally increase, for example, with increasing alkoxysilane silane functional poly(ether-urethane) molecular weight and plasticizer level.

Useful substrates for the articles of the invention include but are not limited to those selected from the group consisting of glass, metal, wood, and polymers. Useful metal substrates include, for example, cold rolled steel, primed steel, galvanized steel, and aluminum. Useful polymeric substrates include, for example, thermoplastics, paint coated surfaces, and fiberglass reinforced plastics.

Useful primers, paints, and paint sealers include for example those which utilize epoxy, acrylic, urethane, lacquer and enamel chemistries in commercially available formulations. Other paints, primers and paint sealers are also considered as useful and the above examples shall not be considered as limiting in ally way.

D. Test Methods

Viscosity

Viscosities were determined at 22° C. using a Brookfield DV-1+ viscometer and are reported in Pascal seconds (Pa sec).

Spectroscopy

IR spectra were obtained using a Nicolet 510 FT-IR spectrometer. NMR spectra were obtained using a Varion Unity 500 NMR Spectrometer. The NMR Spectrometer was operated at 500 megahertz to obtain $^1$H-NMR spectra. All NMR runs were carried out using $CDCl_3$ solvent at 22° C. using standard acquisition parameters.

Tack Free Time

This test was performed in a controlled environment having a temperature of 21° C. and a relative humidity of 50%. A 0.64 cm bead of moisture curable sealant composition was applied to the test surface. Tack free time was the time required to produce a surface on the moisture curable sealant composition bead which could be lightly touched by an applicator stick without transfer to the applicator stick.

Hardness

This test was performed in a controlled environment having a temperature of 21° C. and a relative humidity of 50%. A 0.64 cm bead of moisture curable sealant composition was applied to the test surface. The hardness of the bead was measured after 24 hours (initial reading) and after seven days (final reading), using a Shore Durometer Type A.

Adhesion

A 0.64 cm diameter, 22.9 cm long bead of moisture curable sealant composition was applied to a cold rolled steel panel (30.5 cm×10.16 cm) that had been cleaned by wiping first with methyl ethyl ketone, then with toluene, and then again with methyl ethyl ketone. The bead was allowed to cure for one week in a controlled environment having a temperature of 21° C. and a relative humidity of 50%. One end of the bead was cut away from the steel panel to form a free end. The free end was pulled, and the failure mode of the sealer was noted. Cohesive failure occurred when the sealer split, leaving sealer residue on the panel. Adhesive failure occurred when the sealer lifted off the panel, leaving no residue. Of these two modes of failure, cohesive failure is preferred.

Cold Flexibility

A panel bearing a bead of cured, moisture curable sealant composition was prepared as described according to the adhesion test method above. The panel was cooled and held at −20° C. for one hour. The panel was then quickly bent 180 degrees over a 2.54 cm diameter rod with the sealer on the outside radius. The sealer failed this test if it pulled away from the panel without leaving any residue (i.e., adhesive failure) or if it showed any cracks at the point of bending.

Wet-On-Wet Paintability

A 0.64 cm diameter, 22.9 cm long bead of moisture curable sealant composition was applied to a cold rolled steel panel (30.5 cm×10.16 cm) that had been previously cleaned by wiping first with methyl ethyl ketone, then with toluene, and then again with methyl ethyl ketone. The bead was then smoothed to form a 0.16 cm thick film. Paint (PPG Deltron base clear available from Pittsburgh Paint & Glass, Inc. located in Strongsville, Ohio) was applied to separate films of the moisture curable sealant composition immediately and after the films of moisture curable sealant composition had aged for one hour, 24 hours, and 72 hours. The painting sequence was per the manufacturer instructions: One part base coat (DBU 9700) was mixed with 1.5 parts reducer (DRR 1170). Two applications of base coat were applied fifteen minutes apart using a spray pressure of 310 kilopascals. A minimum of twenty minutes later, two coatings of the clear coat (comprising 2 parts clear (DCU 2020), 1 part hardener (DU 5), and 1 part reducer (DT 870)) were applied to the base coat fifteen minutes apart using a spray pressure of 310 kilopascals. The paint surface was examined for the presence of cracking, wrinkling, or shrinkage. The resulting laminates comprising substrate, moisture curable sealant composition, and paint were allowed to age for three days. Each laminate was then examined to determine whether the paint and moisture curable sealant composition had cured properly. Proper paint cure was indicated by a dry paint surface. Proper moisture curable sealant composition cure was determined by cutting the sealer and examining whether it was dry throughout. If no defects were seen using these inspection procedures, the sealer was considered to have wet-on-wet paintability.

Paint Adhesion Test

A 0.64 cm diameter, 22.9 cm long bead of moisture curable sealant composition was applied to a cold rolled steel panel (30.5 cm×10.16 cm) that had been previously cleaned by wiping first with methyl ethyl ketone, then with toluene, and then again with methyl ethyl ketone. The bead was then smoothed to form a 0.16 cm thick film. Paint (PPG Deltron base clear available from Pittsburgh Paint & Glass, Inc. located in Strongsville, Ohio) was applied to separate films of the moisture curable sealant compositions immediately and after the films of moisture curable sealant composition had aged for one hour, 24 hours, and 72 hours. The painting sequence was per the manufacturer instructions: One part base coat (DBU 9700) was mixed with 1.5 parts reducer (DRR 1170). Two applications of base coat were applied fifteen minutes apart using a spray pressure of 310 kilopascals. A minimum of twenty minutes later, two coatings of the clear coat (comprising 2 parts clear (DCU 2020), 1 part hardener (DU 5), and 1 part reducer (DT 870)) were applied to the base coat fifteen minutes apart using a spray pressure of 310 kilopascals. The resulting laminates comprising substrate, moisture curable sealant composition, and paint were allowed to age for three days.

The paint adhesion of the moisture curable sealant compositions of the invention were then measured using ASTM 3359B. Thus, the test specimen was crosshatched with a razor, adhesive tape (3M Scotch™ 898 filament tape) was applied, and then withdrawn in a peel mode. The sample ratings corresponded to the percentage of paint film, as shown in the following chart:

| Sample Rating | % Paint Removed |
| --- | --- |
| 5B | 0 |
| 4B | 1–5 |
| 3B | 6–15 |
| 2B | 16–30 |
| 1B | 31–60 |
| 0B | over 60 |

Preferably, a moisture curable sealant composition which has been painted one hour after its application to a substrate will have a paint adhesion value of at least 4B, more preferably 5B. Preferably, a moisture curable sealant composition which has been painted 24 hours after its application to a substrate will also have a paint adhesion value of at least 4B, more preferably 5B. Preferably, a moisture curable sealant composition which has been painted 72 hours after its application to a substrate will have a paint adhesion value of at least 3B, more preferably at least 4B, and most preferably 5B.

Shelf Life

A cartridge containing the moisture curable sealant composition was tested for viscosity, tack free time, hardness, adhesion, and cold flexibility, and then stored at 50° C. After four weeks, the moisture curable sealant composition was resubmitted to the above tests. If the moisture curable sealant composition remained homogeneous and again passed these tests, then the moisture curable sealant composition was considered to have good shelf life. Cartridges used for aging were high density polyethylene.

The following table defines the materials which were used in the Examples.

| | |
| --- | --- |
| Texcar PC | 1,2-propylene carbonate (Huntsman Corp., Houston, TX) |
| Silquest A1100 | 3-aminopropyltriethoxysilane (OSi Specialties, Danbury, CT) |
| Dabco T-12 | dibutyltin dilaurate (Air Products, Allentown, PA) |
| Pluronic L92 | EO(PO)EO polyether diol, 20 mol % EO, MW 3650 (BASF, Mount Olive, NJ) |
| Arcol E351 | EO(PO)EO polyether diol, 15 mol % EO, MW 2800 (ARCO, Newtown Square, PA) |
| Desmodur H | 1,6-hexane diisocyanate (Bayer, Inc., Pittsburgh, PA) |
| Desmodur I | isophorone diisocyanate (Bayer, Inc.) |
| Mondur TD-80 | Blend of 2,4- and 2,6-tolylene diisocyanate (80:20) (Bayer, Inc.) |
| TMXDI | 1,3-($\alpha,\alpha,\alpha',\alpha'$-tetramethyl)(xylylene diisocyanate (Cytec, Wayne, NJ) |
| Desmodur W | 4,4'-methylenedicyclohexylisocyanate (Bayer, Inc.) |
| Mondur M | 4,4'-methylene diphenylisocyanate (Bayer, Inc.) |
| Jayflex DIDP | diisodecyl phthalate (Exxon, Houston, TX) |
| Ritcizer-8 | N-ethyl toluenesulfonamide (Rit-Chem Co., Pleasantville, NY) |
| PlastHall DOA | di(2-ethylhexyl) adipate (C. P. Hall Co., Chicago, IL) |
| Tinuvin 770 | bis(2,2,6,6-tetramethyl-4-piperidyl) sebacate (Ciba-Geigy, Hawthorne, NY) |
| Irganox 1010 | pentaerythritol tetrakis[3-(3,5-di-tert-butyl-4-hydroxyphenyl)propionate] (Ciba-Geigy) |
| Dislon 6500 | polyamide thickener (King Industries, Norwalk, CT) (currently named Disparlon 6500) |
| Ultrapflex | 0.07 micron, precipitated, stearated calcium carbonate (Specialty Minerals, Adams, MA) |
| Pfinyl 402 | 5.5 micron, ground, stearated calcium carbonate (Specialty Minerals) |
| Isopar H | aliphatic hydrocarbon solvent (Exxon) |
| Silquest A171 | vinyltrimethoxysilane (OSi Specialties) |
| Silquest A1120 | 3-(2-aminoethyl)aminopropyltrimethoxysilane (OSi Specialties) |
| Neostann U220 | dibutyltin diacetylacetonate (Kaneta, America, New York, NY) |

The invention is further illustrated by the following examples, but the particular materials and amounts thereof recited in these examples, as well as other conditions and details, should not be construed to unduly limit this invention.

EXAMPLE 1

Formation of a Hydroxycarbamoylsilane (HyCS)

A mixture of 51 grams (0.5 moles) Texcar PC and 110.5 grams 0.5 moles) Silquest A1100 was prepared in a glass jar. The glass jar was capped and shaken without external temperature control. The mixture slowly exothermed to about 60° C. The degree of reaction was about 90% after 18 hours, as determined by comparison of the integrals of the carbonate (about 1800 cm$^{-1}$) and carbamate (about 1700 cm$^{-1}$) peaks in the IR spectrum.

General Procedure for the Preparation of Alkoxysilane Functional Poly(ether-urethane)s The polyether polyol was mixed with phosphoric acid (85 wt % solution in water, 0.14 mmol acid per kilogram polyol) and then dried over a four hour period at 105° C. under pump vacuum (about 0.5 torr). The polyether polyol was allowed to cool to about 50° C. in the absence of moisture and then mixed under a nitrogen blanket with a diisocyanate and Dabco T-12. The mixture was agitated without external temperature control for one half hour, then heated to and held at 70° C. for three hours. The isocyanate functional poly(ether-urethane) thus obtained was allowed to cool to about 50° C., an hydroxycarbamoylsilane prepared as in Example 1 was added and mixed under a nitrogen blanket, and the mixture was again heated to and held at 70° C. An IR spectrum was taken after the mixture had been held at 70° C. for six hours and exhibited no isocyanate band (2270 cm$^{-1}$).

The identities and quantities of polyether polyols and diisocyanates used and the quantities of hydroxycarbamoyl-silane (HyCS) and Dabco T-12 used are shown in Table 1. The viscosities and theoretical molecular weights of the resulting alkoxysilane functional poly(ether-urethane)s are shown in Table 2. Note that Examples C5–C9 are comparative.

urethanes) prepared in Examples 2–4 and Comparative Examples C5–C9 according to the generalized procedure below. The actual component weights used to prepare each moisture curable sealant composition are shown in Table 3.

A vacuum reactor fitted with a high shear mixer was flushed with nitrogen and filled with the following components:

220 grams alkoxysilane functional poly(ether-urethane) of Examples 2–4 and Comparative Examples C5–C9 (as specified in Table 4),
Plasticizer (selected from Jayflex DIDP, Ritcizer-8, and PlastHall DOA as specified in Table 3),
2.2 grams Tinuvin 770,
8.8 grams Irganox 1010, and
0.1 grams Elftex 8.

The components were mixed at low shear for 5 minutes while under a nitrogen blanket. Dislon 6500 (see Table 3) was added and mixing, occurred at high shear for 10 minutes. Ultrapflex (200 grams, previously dried overnight at 105° C.) and Pfinyl 402 (440 grams, previously dried overnight at 105° C.) were added and mixed at high speed under full vacuum for 30 minutes while heating the mixture to 90° C. The mixture was then cooled to 50° C., and the reactor purged with nitrogen to break the vacuum. A solution containing Isopar H (see Table 3), 0.2 grams of Dabco T-12, and 6.6 grams of Silquest A171 was added and mixed at high shear for 1 hour under nitrogen at 50° C. A solution containing 11.0 grams of Silquest A1120, 4.4 grams of Neostann U220, and N-methylpyrrolidinone (NMP, see Table 3) was then added and mixed at high shear for 15 minutes under nitrogen at 50° C. A vacuum was applied to the resulting mixture to remove all nitrogen bubbles. The mixture was then immediately transferred into thick walled high density polyethylene cartridges.

TABLE 1

| Ex. | Polyether Polyol | Polyether Polyol wt (meq OH) | Diisocyanate | Diisocyanate wt (meq NCO) | HyCS wt (meq OH) | Dabco T-12 wt |
|---|---|---|---|---|---|---|
| 2 | Pluronic L92 | 211.21 g (115.7) | Desmodur H | 15.72 g (187.2) | 23.07 g (71.4) | 0.11 g |
| 3 | Pluronic L92 | 713.59 g (391.0) | Desmodur I | 67.77 g (603.5) | 68.64 g (212.5) | 1.43 g |
| 4 | Pluronic L92 | 701.14 g (384.2) | Desmodur I | 70.42 g (627.0) | 78.44 g (242.9) | 1.40 g |
| C5 | Arcol E351 | 202.36 g (147.4) | Desmodur I | 24.57 g (218.8) | 23.07 g (71.4) | 0.40 g |
| C6 | Pluronic L92 | 674.15 g (369.4) | Mondur TD-80 | 52.02 g (598.0) | 73.83 g (228.6) | 0.34 g |
| C7 | Pluronic L92 | 204.54 g (112.1) | TMXDI | 22.39 g (183.5) | 23.07 g (71.4) | 0.82 g |
| C8 | Pluronic L92 | 203.00 g (111.2) | Desmodur W | 23.93 g (182.7) | 23.07 g (71.4) | 0.41 g |
| C9 | Pluronic L92 | 204.03 g (111.8) | Mondur M | 22.90 g (183.2) | 23.07 g (71.4) | 0.04 g |

TABLE 2

| Example | Alkoxysilane Functional Poly(ether-urethane) Viscosity | Alkoxysilane Functional Poly(ether-urethane) Molecular Weight |
|---|---|---|
| 2 | 210 Pa sec | 7000 |
| 3 | 42.6 Pa sec | 8000 |
| 4 | 33.6 Pa sec | 7000 |
| C5 | 61.8 Pa sec | 7000 |
| C6 | 50.5 Pa sec | 7000 |
| C7 | 48.4 Pa sec | 7000 |
| C8 | 118.6 Pa sec | 7000 |
| C9 | 184.8 Pa sec | 7000 |

Procedure for the Preparation of Moisture Curable Sealant Compositions

Moisture curable sealant compositions were prepared from each of the alkoxysilane terminated poly(ether-

TABLE 3

| | Example | | | | | | | |
|---|---|---|---|---|---|---|---|---|
| | 10 | 11 | 12 | C13 | C14 | C15 | C16 | C17 |
| Jayflex DIDP wt. | 0 | 0 | 0 | 0 | 160 g | 0 | 0 | 0 |
| Ritcizer-8 wt. | 0 | 0 | 20 g | 0 | 0 | 0 | 0 | 0 |
| PlastHall DOA wt. | 100 g | 100 g | 80 g | 100 g | 0 | 100 g | 100 g | 100 g |

TABLE 3-continued

| | Example | | | | | | | |
|---|---|---|---|---|---|---|---|---|
| | 10 | 11 | 12 | C13 | C14 | C15 | C16 | C17 |
| Dislon 6500 wt. | 10 g | 10 g | 10 g | 10 g | 6.6 g | 10 g | 10 g | 10 g |
| Isopar H wt. | 37.4 g | 37.4 g | 37.4 g | 37.4 g | 30 g | 37.4 g | 37.4 g | 37.4 g |
| NMP wt. | 26.4 g | 26.4 g | 26.4 g | 26.4 g | 11 g | 26.4 g | 26.4 g | 26.4 g |

The moisture curable sealant compositions of Examples 10–12 and C13–C17 performed acceptably when tested in accordance with the tack free time, hardness, adhesion, cold flexibility, wet-on-wet paintability, and shelf life tests described above. Results of the viscosity and paint adhesion tests are shown in Table 4.

TABLE 4

| | Alkoxysilane Functional Poly(ether-urethane) | Paint adhesion ASTM 3359B | | |
|---|---|---|---|---|
| Ex. | | 1 hour | 24 hour | 72 hour |
| 10 | Example 2 | 4B | 4B | 5B |
| 11 | Example 3 | 5B | 5B | 5B |
| 12 | Example 4 | 5B | 4B | 5B |
| C13 | Example C5 | 3B | 0B | 0B |
| C14 | Example C6 | 0B | 0B | 0B |
| C15 | Example C7 | 1B | 1B | 2B |
| C16 | Example C8 | 0B | 0B | 0B |
| C17 | Example C9 | 0B | 0B | 0B |

It will be apparent to those skilled in the art that various modifications and variations can be made in the method and article of the present invention without departing from the spirit or scope of the invention. Thus, it is intended that the present invention cover the modifications and variations of this invention provided they come within the scope of the appended claims and their equivalents.

What is claimed is:

1. A moisture curable sealant composition comprising an alkoxysilane functional poly(ether-urethane) having formula (I):

$$\left\{ J \left( L \left( O \underset{H}{\underset{|}{N}} \underset{O}{\overset{\parallel}{C}} O R^4 O \underset{H}{\underset{|}{N}} \underset{O}{\overset{\parallel}{C}} \right)_z L \underset{H}{\underset{|}{N}} \underset{O}{\overset{\parallel}{C}} R^4 \underset{H}{\underset{|}{N}} \underset{O}{\overset{\parallel}{C}} Y \underset{(OR^5)_n}{\overset{(R^6)_{(3-n)}}{Si}} \right)_x \right\}$$

wherein:
J is selected from the group consisting of alkyl, aryl, alkylene, alkarylene, and arylene with valence x and a number average molecular weight of less than about 250;
each L is independently selected from the group consisting of (i) a polyether segment comprising ethylene oxide (EO) units distributed randomly or in blocks, the segment comprising greater than about 15 mol % and less than about 40 mol % EO and the segment having a number average molecular weight of about 2000 to about 8,000, and (ii) a divalent alkylene group having a number average molecular weight of less than about 200;
each $R^4$ is independently selected from the group consisting of $C_2$ to $C_{10}$ alkylene and cycloalkylene;
each z is independently selected from integers greater than or equal to zero;
each Y is independently selected from the group consisting of linear, branched, and cyclic alkylene groups having at least two carbon atoms;
each $R^5$ is independently selected from the group consisting of $C_2$ to $C_4$ alkyl;
each $R^6$ is independently selected from the group consisting of hydrogen, alkyl, and aryl;
each n is independently selected from integers 1 to 3; and
each x is independently selected from integers greater than or equal to 1
each X is a divalent linking group having formula $$-O - \underset{R^9}{\overset{R^8}{\underset{|}{C}}} - \underset{R^{11}}{\overset{R^{10}}{\underset{|}{C}}} - \left( \underset{R^{13}}{\overset{R^{12}}{\underset{|}{C}}} \right)_m - O - \underset{R^7}{\overset{O}{\underset{|}{C}}} - N -$$

wherein each $R^8$, $R^9$, $R^{10}$, $R^{11}$, $R^{12}$, and $R^{13}$ is independently selected from the group consisting of hydrogen and $C_1$ to $C_6$ alkyl;
each m is independently selected from the group consisting of integers from 0 to 2; and
each $R^7$ is independently selected from the group consisting of hydrogen and $C_1$ to $C_6$ alkyl; wherein the composition has at one hour after coating a paint adhesion of at least 4B as measured by ASTM 3359B.

2. The composition of claim 1 wherein each L is independently selected from the group consisting of (i) a polyether segment comprising an internal polypropylene oxide block and terminal polyethylene oxide blocks, the segment comprising 20 to 30 mol % EO and the segment having a number average molecular weight of about 3000 to about 6000.

3. The composition of claim 1 wherein each $R^4$ is independently selected from a group consisting of 1,6-hexylene and isophorone-diyl.

4. The composition of claim 1 wherein each z is independently selected from integers 0 to 4.

5. The composition of claim 1 wherein each $R^5$ is ethyl.

6. The composition of claim 1 wherein each n is the integer 3.

7. The composition of claim 1 wherein x is selected from integers 2 to 4.

8. The composition of claim 1 which has at 24 hours after coating a paint adhesion of at least 4B as measured by ASTM 3359B.

9. The composition of claim 1 which has at 72 hours after coating a paint adhesion of at least 3B as measured by ASTM 3359B.

10. A moisture curable sealant composition comprising a homogenous blend comprising:
(a) 100 parts by weight of an alkoxysilane functional poly(ether-urethane) of formula (I):

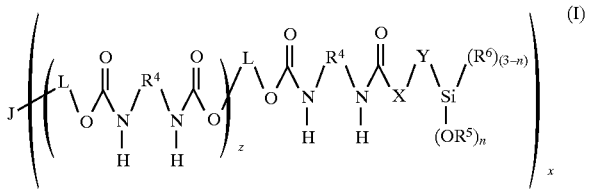

wherein:
- J is selected from the group consisting of alkyl, aryl, alkylene, alkarylene, and arylene with valence x and a number average molecular weight of less than about 250;
- each L is independently selected from the group consisting of (i) a polyether segment comprising ethylene oxide (EO) units distributed randomly or in blocks, the segment comprising greater than about 15 mol % and less than about 40 mol % EO and the segment having a number average molecular weight of about 2000 to about 8,000, and (ii) a divalent alkylene group having a number average molecular weight of less than about 200;
- each $R^4$ is independently selected from the group consisting of $C_2$ to $C_{10}$ alkylene and cycloalkylene;
- each z is independently selected from integers greater than or equal to zero;
- each Y is independently selected from the group consisting of linear, branched, and cyclic alkylene groups having at least two carbon atoms;
- each $R^5$ is independently selected from the group consisting of $C_2$ to $C_4$ alkyl;
- each $R^6$ is independently selected from the group consisting of hydrogen, alkyl, and aryl;
- each n is independently selected from integers 1 to 3;
- each x is independently selected from integers greater than or equal to 1;
- each X is a divalent linking group having formula

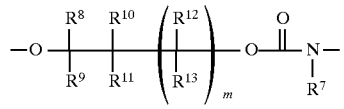

wherein each $R^8$, $R^9$, $R^{10}$, $R^{11}$, $R^{12}$, and $R^{13}$ is independently selected from the group consisting of hydrogen and $C_1$ to $C_6$ alkyl;
- each m is independently selected from the group consisting of integers from 0 to 2; and
- each $R^7$ is independently selected from the group consisting of hydrogen and $C_1$ to $C_6$ alkyl;

(b) 10 to 100 parts by weight of at least one plasticizer;
(c) 0.1 to 10 parts by weight of at least one antioxidant;
(d) 1 to 5 parts by weight of at least one catalyst;
(e) 0.1 to 10 parts by weight of at least one adhesion promoter;
(f) 0 to 10 parts by weight of at least one dehydrator;
(g) 0 to 400 parts by weight of at least one filler;
(h) 0 to 10 parts by weight of at least one rheology modifier; and
(i) 0 to 40 parts by weight of an organic solvent;
wherein the composition has at one hour after coating a paint adhesion of at least 4B as measured by ASTM 3359B.

11. The composition of claim 10 wherein each L is independently selected from the group consisting of (i) a polyether segment comprising an internal polypropylene oxide block and terminal polyethylene oxide blocks, the segment comprising 20 to 30 mol % EO and the segment having a number average molecular weight of about 3000 to about 6000.

12. The composition of claim 10 wherein each $R^4$ is independently selected from a group consisting of 1,6-hexylene and isophorone-diyl.

13. The composition of claim 10 wherein each z is independently selected from integers 0 to 4.

14. The composition of claim 10 wherein each $R^5$ is ethyl.

15. The composition of claim 10 wherein each n is the integer 3.

16. The composition of claim 10 wherein each x is independently selected from integers 2 to 4.

17. The composition of claim 10 which has at 24 hours after coating a paint adhesion of at least 4B as measured by ASTM 3359B.

18. The sealant composition of claim 10 which has at 72 hours after coating a paint adhesion of at least 3B as measured by ASTM 3359B.

19. An article comprising a laminate, wherein the laminate comprises:
(a) a substrate;
(b) a layer of the moisture curable sealant composition of claim 10 coated on at least a portion of the substrate; and
(c) a layer of one or more of the following coated over the layer of the moisture curable sealant composition: (i) paint, (ii) primer, (iii) paint sealer.

20. The article of claim 19 wherein each L is independently selected from the group consisting of (i) a polyether segment comprising an internal polypropylene oxide block and terminal polyethylene oxide blocks, the segment comprising 20 to 30 mol % EO and the segment having a number average molecular weight of about 3000 to about 6000.

21. The article of claim 19 wherein each $R^4$ is independently selected from the group consisting of 1,6-hexylene and isophorone-diyl.

22. The article of claim 19 wherein each z is independently selected from integers 0 to 4.

23. The article of claim 19 wherein each $R^5$ is independently ethyl.

24. The article of claim 19 wherein each n is the integer 3.

25. The article of claim 19 wherein each x is independently selected from integers 2 to 4.

26. The article of claim 19 wherein the composition has at one hour after coating a paint adhesion of at least 4B as measured by ASTM 3359B.

27. The article of claim 19 wherein the composition has at 24 hours after coating a paint adhesion of at least 4B as measured by ASTM 3359B.

28. The article of claim 19 wherein the composition has at 72 hours after coating a paint adhesion of at least 3B as measured by ASTM 3359B.

29. An article comprising a laminate, wherein the laminate comprises:
(a) a substrate;
(b) a cured layer of the moisture curable sealant composition of claim 11 bonded to at least a portion of the substrate; and
(c) a layer of one or more of the following coated over the layer of the moisture curable sealant composition position: (i) paint, (ii) primer, (iii) paint sealer.

30. The article of claim 29 wherein each L is independently selected from the group consisting of (i) a polyether segment comprising an internal polypropylene oxide block and terminal polyethylene oxide blocks, the segment comprising 20 to 30 mol % EO and the segment having a number average molecular weight of about 3000 to about 6000.

31. The article of claim 29 wherein each $R^4$ is independently selected from the group consisting of 1,6-hexylene and isophorone-diyl.

32. The article of claim 29 wherein each z is independently selected from integers 0 to 4.

33. The article of claim 29 wherein each $R^5$ is ethyl.

34. The article of claim 29 wherein each n is the integer 3.

35. The article of claim 29 wherein each x is independently selected from integers 2 to 4.

36. The article of claim 29 wherein the composition has at one hour after coating a paint adhesion of at least 4B as measured by ASTM 3359B.

37. The article of claim 29 wherein the composition has at 24 hours after coating a paint adhesion of at least 4B as measured by ASTM 3359B.

38. The article of claim 29 wherein the composition has at 72 hours after coating a paint adhesion of at least 3B as measured by ASTM 3359B.

39. An article comprising a laminate, wherein the laminate comprises:
   (a) a substrate;
   (b) a layer of the moisture curable sealant composition of claim 11 coated on at least a portion of the substrate;
   (c) a layer of primer coated over the layer of moisture curable sealant composition; and
   (d) a layer of point coated over the layer of primer.

40. The article of claim 39 wherein each L is independently selected from the group consisting of (i) a polyether segment comprising an internal polypropylene oxide block and terminal polyethylene oxide blocks, the segment comprising 20 to 30 mol % EO and the segment having number average molecular weight of about 3000 to about 6000.

41. The article of claim 39 wherein each $R^4$ is independently selected from the group consisting of 1,6-hexylene and isophorone-diyl.

42. The article of claim 39 wherein each z is independently selected from integers 0 to 4.

43. The article of claim 39 wherein each $R^5$ is ethyl.

44. The article of claim 39 wherein each n is the integer 3.

45. The article of claim 39 wherein each x is independently selected from integers 2 to 4.

46. The article of claim 39 wherein the composition has at one hour after coating a paint adhesion of at least 4B as measured by ASTM 3359B.

47. The article of claim 39 wherein the composition has at 24 hours after coating a paint adhesion of at least 4B as measured by ASTM 3359B.

48. The article of claim 39 wherein the composition has at 72 hours after coating a paint adhesion of at least 3B as measured by ASTM 3359B.

49. An article comprising a laminate, wherein the laminate comprises:
   (a) a substrate;
   (b) a cured layer of the moisture curable sealant composition of claim 10 bonded to at least a portion of the substrate;
   (c) a layer of primer coated over the cured layer of moisture curable sealant composition; and
   (d) a layer of paint coated over the layer of primer.

50. The article of claim 49 wherein each L is independently selected from the group consisting of (i) a polyether segment comprising an internal polypropylene oxide block and terminal polyethylene oxide blocks, the segment comprising 20 to 30 mol % EO and the segment having number average molecular weight of about 3000 to about 6000.

51. The article of claim 49 wherein each $R^4$ is independently selected from a group consisting of 1,6-hexylene and isophorone-diyl.

52. The article of claim 49 wherein each z is independently selected from integers 0 to 4.

53. The article of claim 49 wherein each $R^5$ is ethyl.

54. The article of claim 49 wherein each n is the integer 3.

55. The article of claim 49 wherein each x is independently selected from integers 2 to 4.

56. The article of claim 49 wherein the composition has at one hour after coating a paint adhesion of at least 4B as measured by ASTM 3359B.

57. The article of claim 49 wherein the composition has at 24 hours after coating a paint adhesion of at least 4B as measured by ASTM 3359B.

58. The article of claim 49 wherein the composition has at 72 hours after coating a paint adhesion of at least 3B as measured by ASTM 3359B.

59. The article of claim 29 which forms a portion of a vehicle selected from the group consisting of land vehicles, aircraft, and watercraft.

60. The article of claim 29 which forms a portion of a vehicle selected from the group consisting of land vehicles, aircraft, and watercraft.

61. The article of claim 19 wherein
   each L is independently selected from the group consisting of (i) a polyether segment comprising an internal polypropylene oxide block and terminal polyethylene oxide blocks, the segment comprising 20 to 30 mol % EO and the segment having a number average molecular weight of about 3000 to about 6000;
   each $R^4$ is independently selected from a group consisting of 1,6-hexylene and isophorone-diyl;
   each z is independently selected from integers 0 to 4;
   each $R^5$ is ethyl;
   each $R^7$ is hydrogen;
   each $R^8$ is independently selected from the group consisting of hydrogen and methyl;
   each $R^9$ is hydrogen;
   each $R^{10}$ is independently selected from the group consisting of hydrogen and methyl;
   each $R^{11}$ is hydrogen;
   each n is the integer 3;
   each Y is 1,3-propylene;
   each x is independently selected from integers 2 to 4; and
   each m is 0.

62. The composition of claim 1 wherein each m is 0; each $R^8$ is methyl; each $R^9$ is hydrogen; each $R^{10}$ is hydrogen; each $R^{11}$ is hydrogen; and each $R^7$ is hydrogen.

63. The composition of claim 10 wherein each m is 0; each $R^8$ is methyl; each $R^9$ is hydrogen; each $R^{10}$ is hydrogen; each $R^{11}$ is hydrogen; and each $R^7$ is hydrogen.

64. The article of claim 19 wherein each m is 0; each $R^8$ is methyl; each $R^9$ is hydrogen; each $R^{10}$ is hydrogen; each $R^{11}$ is hydrogen; and each $R^7$ is hydrogen.

65. The article of claim 29 wherein each m is 0; each $R^8$ is methyl; each $R^9$ is hydrogen; each $R^{10}$ is hydrogen; each $R^{11}$ is hydrogen; and each $R^7$ is hydrogen.

66. The article of claim 39 wherein each m is 0; each $R^8$ is methyl; each $R^9$ is hydrogen; each $R^{10}$ is hydrogen; each $R^{11}$ is hydrogen; and each $R^7$ is hydrogen.

67. The article of claim 49 wherein each m is 0; each $R^8$ is methyl; each $R^9$ is hydrogen; each $R^{10}$ is hydrogen; each $R^{11}$ is hydrogen; and each $R^7$ is hydrogen.

68. The article of claim 19 wherein each m is 0; each $R^8$ is methyl; each $R^9$ is hydrogen; each $R^{10}$ is hydrogen; each $R^{11}$ is hydrogen; and each $R^7$ is hydrogen.

69. The article of claim 29 wherein each m is 0; each $R^8$ is methyl; each $R^9$ is hydrogen; each $R^{10}$ is hydrogen; each $R^{11}$ is hydrogen; and each $R^7$ is hydrogen.

70. The article of claim 39 wherein each m is 0; each $R^8$ is methyl; each $R^9$ is hydrogen; each $R^{10}$ is hydrogen; each $R^{11}$ is hydrogen; and each $R^7$ is hydrogen.

71. The article of claim 49 wherein each m is 0; each $R^8$ is methyl; each $R^9$ is hydrogen; each $R^{10}$ is hydrogen; each $R^{11}$ is hydrogen; and each $R^7$ is hydrogen.

\* \* \* \* \*

UNITED STATES PATENT AND TRADEMARK OFFICE
CERTIFICATE OF CORRECTION

PATENT NO.: 5,866,651

DATED: February 2, 1999

INVENTOR(S): Dean M. Moren, Ian R. Owen, Kevin M. Eliason, Glen A. Stenlund, and W. Stuart Bigham It is certified that error appears in the above-identified patent and that said Letters Patent is hereby corrected as shown below:

Column 19, line 27, "claim 11" should read --claims 10--;

Column 19, line 30, "point" should read --paint--; and

Column 20, line 27, "claim 29" should read --claim 49--.

Signed and Sealed this

Twenty-eighth Day of September, 1999

Attest:

Q. TODD DICKINSON

Attesting Officer

Acting Commissioner of Patents and Trademarks